Patented Dec. 11, 1951

2,578,641

UNITED STATES PATENT OFFICE 2,578,641

BICYCLOHEXYLAMINE SALT OF PENICILLIN

Douglas E. Cooper, Syracuse, N. Y., assignor to Bristol Laboratories, Inc., Syracuse, N. Y., a corporation of New York No Drawing. Application September 4, 1946, Serial No. 694,820

2 Claims. (Cl. 260—239.1)

This invention relates to penicillin and salts of penicillin, and more particularly to certain amine salts of penicillin.

An object of this invention is to produce antibiotic substances efficiently and economically.

Another object of this invention is to isolate stable salts of penicillin which possess extremely high antibiotic characteristics.

Another object of this invention is to provide penicillin salts having a high degree of purity.

In the production and utilization of penicillin and salts thereof for use as antibiotic products, various methods have heretofore been proposed for concentrating and purifying such products. The concentration of penicillin in the broth after fermentation expressed as Oxford units has usually been found to be within the range of from 150 to 800 units per ml. To utilize a penicillin product for therapeutic purposes, it is desirable that the concentration be in the neighborhood of 5,000 to 300,000 units per ml. The penicillin or salt thereof contained in the fermentation broth is ordinarily isolated and concentrated by repeated conversion to penicillin, extraction with a suitable solvent, such as amyl acetate, and reconversion to a salt of penicillin such as sodium penicillin. While concentrations of 30,000 to 50,000 Oxford units per ml. may be obtained by the practice of this method, the products so produced are substantially contaminated with impurities such as plant pigments. The purpose of conversion to the acid form and reconversion to a salt, such as sodium penicillin, is to concentrate and purify the product. Since the utilization of the formation of certain salts of penicillin, such as the sodium salt thereof, results in impure products, various other derivatives have been proposed for securing greater purity of the resulting product. For example, a crystalline benzylamine derivative has been reported (Science, 102, 628 (1945)) but this derivative has been found, due apparently to a major modification of the penicillin structure, to have substantially no antibiotic activity. Moreover, this benzylamine derivative has not by any known methods been regenerated to a substance possessing the antibiotic activity of the penicillin from which it was derived.

In accordance with this invention, salts of penicillin are utilized in the isolation and purification of penicillin and salts thereof whereby a substantially purer product having higher antibiotic action is obtained than by the methods heretofore employed. The compositions of this invention are salts of penicillin and a substituted cyclohexylamine having the formula:

in which X is a cyclohexyl nucleus and R is a member selected from the group consisting of Lower alkyl radicals,
Lower alkoxy radicals,
4-cycloalkyl radicals,
The 4-amine radical,
4-aryl radicals,
The 4-(4'-amino cyclohexyl) radical, and
The 2-methyl, 2-5-isopropylidene radical.

These salts may be prepared by reacting penicillin with a substituted cyclohexylamine as heretofore defined, or alternately by reacting a salt of the substituted cyclohexylamine with a salt of penicillin. Desirably, the substituted cyclohexylamine salt of penicillin is produced by reacting the amine or salt thereof with penicillin or a salt of penicillin, such as sodium penicillin, in a solvent in which the penicillin or the penicillin salt as well as the amine or salt thereof is soluble and the resulting reaction product is substantially insoluble. As a result of this procedure, the substituted cyclohexylamine salt of penicillin separates from the solvent and may readily be removed. The practice of this preferred procedure results in a substantially pure product relatively free from pigments when compared with the purity of metallic salts of penicillin, for example, prepared by methods heretofore practiced.

By penicillin is meant one or more of the several antibiotics of empirical formula

produced by the growth of *Penicillium notatum*, *Penicillium chrysogenum*, or these same substances whenever produced by other means. Chemical characteristics of penicillin and possible structures are disclosed in an article presented by the Committee on Medical Research, O. S. R. D., Washington, and the Medical Research Council, London, in Science 102, 627–9 (1945). Penicillin is indicated as being a complex monocarboxylic acid. The product formed by the reaction between the amine as heretofore defined and penicillin is the amine salt of this carboxylic acid group. Examples of the substituted cyclohexylamines which may be employed to produce the salts of this invention are 2-methyl cyclohexylamine, 2-methoxy cyclohexylamine, 4-methyl cyclohexylamine, 4-methoxy cyclohexylamine, 4-aminocyclohexylamine, 4-cyclohexylcyclohexylamine, 4-phenylcyclohexylamine, 4 - (4' - aminocyclohexyl)-cyclohexylamine and 2-methyl, 2-5-isopropylidene cyclohexylamine.

These substituted cyclohexylamine salts of penicillin and the processes of this invention may be utilized in the isolation and purification of penicillin and salts of penicillin. For example, the penicillin contained in a dry ethyl ether extract, preferably having a concentration above 5,000 Oxford units per ml., obtained from the fermentation broth may be reacted with 4-cyclohexylcyclohexylamine in a solvent, such as ethyl ether, in which the penicillin and 4-cyclohexylcyclohexylamine are soluble and the 4-cyclohexylcyclohexylamine salt of penicillin is insoluble, after which the 4-cyclohexylcyclohexylamine salt of penicillin may be separated from the solvent. The 4-cyclohexylcyclohexylamine salt of penicillin may, if desired, be converted to another derivative of penicillin, such as sodium penicillin. This conversion may be achieved by dissolving or suspending the 4-cyclohexylcyclohexylamine salt of penicillin in water, converting it to penicillin with a mineral acid at a temperature below about 10° C., extracting the penicillin with amyl acetate, and reconverting the penicillin to another derivative of penicillin such as the sodium salt thereof. By the use of the substituted cyclohexylamine salts of penicillin and by the practice of the method in accordance with this invention, substantially pure derivatives of penicillin are produced.

There are many solvents in which the substituted cyclohexylamine salts of penicillin are substantially insoluble but in which penicillin and the substituted cyclohexylamine are soluble, such as ether, amyl acetate, ethylene dichloride, 2-nitro propane and isopropyl acetate. Accordingly, if it is desired to purify penicillin, it may be dissolved in one of these latter solvents, such as ether, and the substituted cyclohexylamine added to react with the penicillin to produce the salt of the substituted cyclohexylamine. The substituted cyclohexylamine salt of penicillin separates out of the solution whereby it may be easily removed from the reaction mixture and subsequently reconverted to penicillin. Instead of using penicillin to produce the substituted cyclohexylamine salts thereof, certain salts of penicillin, such as ammonium penicillin, may be used which are soluble in solvents in which the substituted cyclohexylamine salts of penicillin are insoluble.

A more comprehensive understanding of this invention is obtained by reference to the following examples:

*Example 1.—Preparation of penicillin salt of 4-cyclohexylcyclohexylamine (alpha form)*

A solution of the alpha form of 4-cyclohexylcyclohexylamine in ether was prepared by shaking the hydrochloride of the alpha form of the amine with a mixture of ether and excess aqueous sodium hydroxide solution. The hydrochlorides of the alpha and beta forms of 4-cyclohexylcyclohexylamine or mixtures thereof or other mineral acid salts of this amine employed in the examples herein are prepared in accordance with the methods disclosed in my copending application filed of even date herewith. The ether solution of 4-cyclohexylcyclohexylamine was washed with water to remove traces of sodium hydroxide and then dried over sodium sulfate. This dry ether solution of the amine was added at below 10° C. with stirring to a dry ether solution of penicillin at below 10° C. until about 1.1 mols amine per mol penicillin was added or until the resulting solution was neutral (1 ml. solution shaken with 5 ml. water produced an aqueous phase of 6.5 to 7.0 pH). The addition of the amine was accompanied by the instantaneous formation of a solid precipitate. The mixture was kept at about 5° C. for three hours and then filtered. The precipitate was washed with ether, with a small volume of acetone (which removed much of the residual yellow color), and finally washed again with ether, after which it was dried in the air or in a desiccator. Substantially quantitative recovery of the penicillin as precipitate was achieved. The precipitate could be recrystallized from alcohol-ether. Bioassay of the recrystallized precipitate indicated a potency of 1150 units per mg. and this result was confirmed by chemical assay procedures. The theoretical potency for a salt containing 1 molecule of penicillin and 1 molecule of amine was calculated as 1155 units per mg. (using 1667 u./mg. as the potency of the sodium salt of penicillin G). Kjeldahl nitrogen analysis gave the following results:

Calculated (as the mono 4-cyclohexylcyclohexylamine salt of penicillin G) 8.16%.

Found (average of six determinations) 8.13.

*Example 2.—Preparation of penicillin salt of 4-cyclohexylcyclohexylamine (beta form)*

A solution of the beta form of 4-cyclohexylcyclohexylamine in ether was prepared by shaking the hydrochloride of the beta form of the amine with a mixture of ether and excess aqueous sodium hydroxide solution. The ether-amine solution was washed with water to remove traces of sodium hydroxide and then dried over sodium sulfate. This dry ether solution of the amine was added at below 10° C. with stirring to a dry ether solution of penicillin at below 10° C. until about 1.1 mols amine per mol penicillin had been added or until the resulting solution was neutral (1 ml. solution shaken with 5 ml. water produced an aqueous phase of 6.5 to 7.0 pH). The addition of the amine was accompanied by the instantaneous formation of a solid precipitate. The mixture was kept at about 5° C. for three hours and then filtered. The precipitate was washed with ether, with a small volume of acetone (which removed much of the residual yellow color), and finally washed again with ether after which it was dried in the air or in a desiccator. Substantially quantitative recovery of the penicillin as precipitate was achieved. The precipitate could be recrystallized from alcohol-ether. Bioassay of the recrystallized precipitate indicated a potency of 1150 units per mg. and this has been confirmed by chemical assay procedures. The theoretical potency for a salt containing 1 molecule of penicillin and 1 molecule of amine was calculated as 1155 units per mg. (using 1667 u./mg. as the potency of the sodium salt of penicillin G). Kjeldahl nitrogen analysis gave the following results:

Calculated (as mono 4-cyclohexylcyclohexylamine salt of penicillin G) 8.16% N.

Found (average of five determinations) 8.08.

*Example 3.—Preparation of penicillin salt of 4-cyclohexylcyclohexylamine (alpha-beta mixture)*

A solution of 4-cyclohexylcyclohexylamines in ether was prepared by shaking the hydrochloride of a mixture of the alpha and beta forms of the amine with a mixture of ether and excess aqueous sodium hydroxide solution. The ether-amine solution was washed with water to remove traces of sodium hydroxide and then dried over sodium sulfate. This dry ether solution of the amine was added at below 10° C. with stirring to a dry ether solution of penicillin at below 10° C. until about 1.1 mols amine per mol penicillin had been added or until the resulting solution was neutral (1 ml. solution shaken with 5 ml. water produced an aqueous phase of 6.5 to 7.0 pH). The addition of the amine was accompanied by the instantaneous formation of a solid precipitate. The mixture was kept at about 5° C. for three hours and then filtered. The precipitate was washed with ether, with a small volume of acetone (which removed much of the residual yellow color), and finally washed again with ether after which it was dried in the air or in a desiccator. The precipitate could be recrystallized from alcohol-ether. Substantially quantitative recovery of the penicillin as precipitate was achieved.

*Example 4.—Preparation of the penicillin salt of 4-cyclohexylcyclohexylamine (beta form) from aqueous solution*

An aqueous solution of the hydrochloride of the beta form of 4-cyclohexylcyclohexylamine was added to an aqueous solution of sodium penicillin to form a mixture containing slightly in excess of one mol amine per mol of penicillin. The addition of the amine hydrochloride solution was accompanied by the formation of a solid precipitate. The mixture was cooled overnight in the icebox and then filtered. The precipitate was washed with a small volume of acetone (which removed much of the residual yellow color), washed with ether, recrystallized from alcohol-ether, and dried in a desiccator. The completeness of precipitation of the penicillin salt depends upon the concentration of the solution since the beta amine salt of penicillin is soluble in water to form solutions containing about 1600 units per ml. (about 1.5 grams per liter). It should be noted, however, that the penicillin used was a mixture of the several penicillins produced in the usual fermentation process.

*Example 5.—Isolation of penicillin from "plant buffer" using 4-cyclohexylcyclohexylamine*

A 103 ml. portion of a clarified "plant buffer" containing a total of 525,000 Oxford units of penicillin was acidified to pH 2.5 with sulfuric acid at a temperature of below 10° C. and extracted with 75 ml. of methylamyl acetate. The "spent buffer" contained 3,000 Oxford units penicillin. The methylamyl acetate extract was dried over anhydrous sodium sulfate, and to it was added a 10% solution of the beta form of 4-cyclohexylcyclohexylamine in methylamyl acetate until the penicillin solution was almost neutral (one ml. solution shaken with 5 ml. water produced an aqueous phase having a pH of 6.0–6.5). The addition of the amine solution was accompanied by the appearance of a solid precipitate. After standing in an ice bath for 30 minutes, the precipitate was separated by filtration. The filtrate, "spent methylamyl acetate" contained 61,500 Oxford units of penicillin. The precipitate was washed with 5 ml. acetone (the wash liquor contained 11,400 Oxford units of penicillin), after which it was dissolved in 100 ml. chloroform. The chloroform solution of the amine salt of penicillin was then extracted with dilute aqueous sodium hydroxide solution until the pH of the aqueous phase was 6.8–7.5 (at which point the penicillin had been extracted completely from the chloroform solution). The final aqueous extract contained 471,700 Oxford units of penicillin. A portion of this final aqueous extract was lyophilized, and sodium penicillin having a potency of 1,115 Oxford units per mg. was produced. A tabulation of the recovery follows:

| | Per cent |
|---|---|
| Loss in "spent buffer" | [1] 0.6 |
| Loss in "spent methylamyl acetate" | [2] 11.7 |
| Loss in acetone wash | 2.2 |
| Loss in "spent CHCl₃" | 0.1 |
| Total losses | 14.6 |
| Recovery in final aqueous extract | 89.7 |
| Total (losses plus recovery) | [3] 104.3 |

[1] Of original penicillin in clarified buffer.
[2] Recoverable.
[3] Error well within precision of bioassay.

Peanut oil suspensions of penicillin salts of the alpha and beta forms of 4-cyclohexylcyclohexylamine have been injected intramuscularly and intraperitoneally into rats, dogs and rabbits. Therapeutic concentrations of penicillin in the blood streams of these animals extending over periods of many hours have thereby been produced.

*Example 6.—Preparation of the penicillin salt of 4-cyclohexylcyclohexylamine utilizing ammonium penicillin*

A solution of penicillin in ether was neutralized by shaking with an aqueous ammonia solution. The aqueous layer containing ammonium penicillin was separated from the ether layer and lyophilized. The ammonium penicillin thus produced was shaken with acetone and the solution filtered to remove undissolved material. The filtrate was treated with an ethereal solution of the beta form of 4-cyclohexylcyclohexylamine and a white precipitate was formed. This precipitate was separated and dried. Other salts of penicillin, such as the alkali metal salts, for example potassium penicillin, and the alkaline earth metal salts, such as calcium penicillin, may be reacted with 4-cyclohexylcyclohexylamine to produce the reaction product of penicillin and 4-cyclohexylcyclohexylamine.

*Example 7.—Preparation of penicillin salts of various substituted cyclohexylamines*

The salts of penicillin and the other substituted cyclohexylamines as herein defined are prepared by the methods as heretofore outlined in Examples 1 to 6, save that the other substituted amines are used for the cyclohexylcyclohexylamines or salts thereof employed in Examples 1 to 6. For example, the salts of the following substituted cyclohexylamines and penicillin were prepared by reacting a solution of the amine in ethyl ether with a solution of penicillin G in ethyl ether:

2-methyl cyclohexylamine
2-methoxy cyclohexylamine
4-methyl cyclohexylamine
4-methoxy cyclohexylamine
4-aminocyclohexylamine
4-phenyl cyclohexylamine
4-(4'-amino cyclohexyl) cyclohexylamine, and
2-methyl, 2-5-isopropylidene cyclohexylamine A precipitate in each case was obtained which was separated by filtration, washed with ethyl ether, dried, and found to possess the expected penicillin activity.

The 4-methoxy cyclohexylamine is a new compound and may be prepared as follows:

20 grams of p-anisidine and the calculated equivalent amount of hydrochloric acid in methanol were reduced at 60 pounds pressure and 50° C. Reduction was slow, and additional amounts of Adams catalyst did not result in adsorption of more than 28 pounds of hydrogen compared with a theoretical amount of 42.2 pounds of hydrogen.

The alcohol was stripped off, residue diluted, alkalized, and extracted with ether. Rectification thru a 12-inch bead column gave

| Ml. | Boiling Point, °C |
|---|---|
| 0.25 | to 130 |
| 2 | 130-170 |
| 2.2 | 170-205 (Mainly 189°) |
| 0.4 | 205-237 |
| 5 | 237-245 (Solidified) |

The last fraction proved to be unreacted p-anisidine. The 2.2 ml. fraction boiled mainly at 189° C. and appeared to be the only clear-cut fraction present. 189° C. is very close to the calculated boiling point for the 4-methoxy cyclohexylamine. This fraction was redistilled through a small, long-neck, flask and there was obtained 1 ml. of constant boiling oil, which was the 4-methoxy cyclohexylamine and which had a boiling point of 187-189° C.

The 4-phenyl cyclohexylamine is a new compound and may be prepared as follows:

700 grams p-aminobiphenyl, when hydrogenated at high temperature and pressure using a nickel catalyst, absorbed 24 grams of hydrogen. This corresponded to 3 mols of hydrogen per mol of amine. Removal of the catalyst left a brown oil. Ten grams of this brown oil were dissolved in 200 ml. ether and 5 ml. glacial acetic acid were added. A white solid was precipitated, filtered, washed with ether, and dried. The yield was 3.8 grams, which would correspond to 2.8 grams of phenylcyclohexylamine. This material had a melting point of 194° C., and the melting point was not raised by recrystallization from chloroform. The hydrochloride was prepared by dissolving the acetate in glacial acetic acid and adding concentrated hydrochloric acid. Melting point of the hydrochloride was 336-8° C. (decomposition). The analysis of the hydrochloride gave the following results:

| C | | H | |
|---|---|---|---|
| Calculated | Found | Calculated | Found |
| 68.0 | 67.8 | 8.57 | 8.32 |

The N-acetyl derivative of the amine was prepared and had a melting point of 164.8-165.5° C. The free base had a boiling point of 140-146° C. at 14 mm. pressure. This distillation yielded a water-white oil which rapidly solidified.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:
1. A salt of penicillin and 4-cyclohexylcyclohexylamine.
2. The process of producing a salt of penicillin and 4 - cyclohexylcyclohexylamine which comprises contacting 4 - cyclohexylcyclohexylamine with penicillin and recovering the resulting salt of penicillin and 4-cyclohexylcyclohexylamine.

DOUGLAS E. COOPER.

REFERENCES CITED

The following references are of record in the file of this patent:

Abraham, "British Journal of Experimental Pathology," June 1942, vol. 23, pp. 103-123.

Heyden, Discovery Report, HII, 2 pages, May 22, 1944.

Heyden, IV, 2 pp., June 15, 1944.

Merch, March 31, 1944, Penicillin G and related compounds, page 1.

British Reports, Br. 234, pp. 1-5, Feb. 12, 1946.